United States Patent Office 3,257,018
Patented June 21, 1966

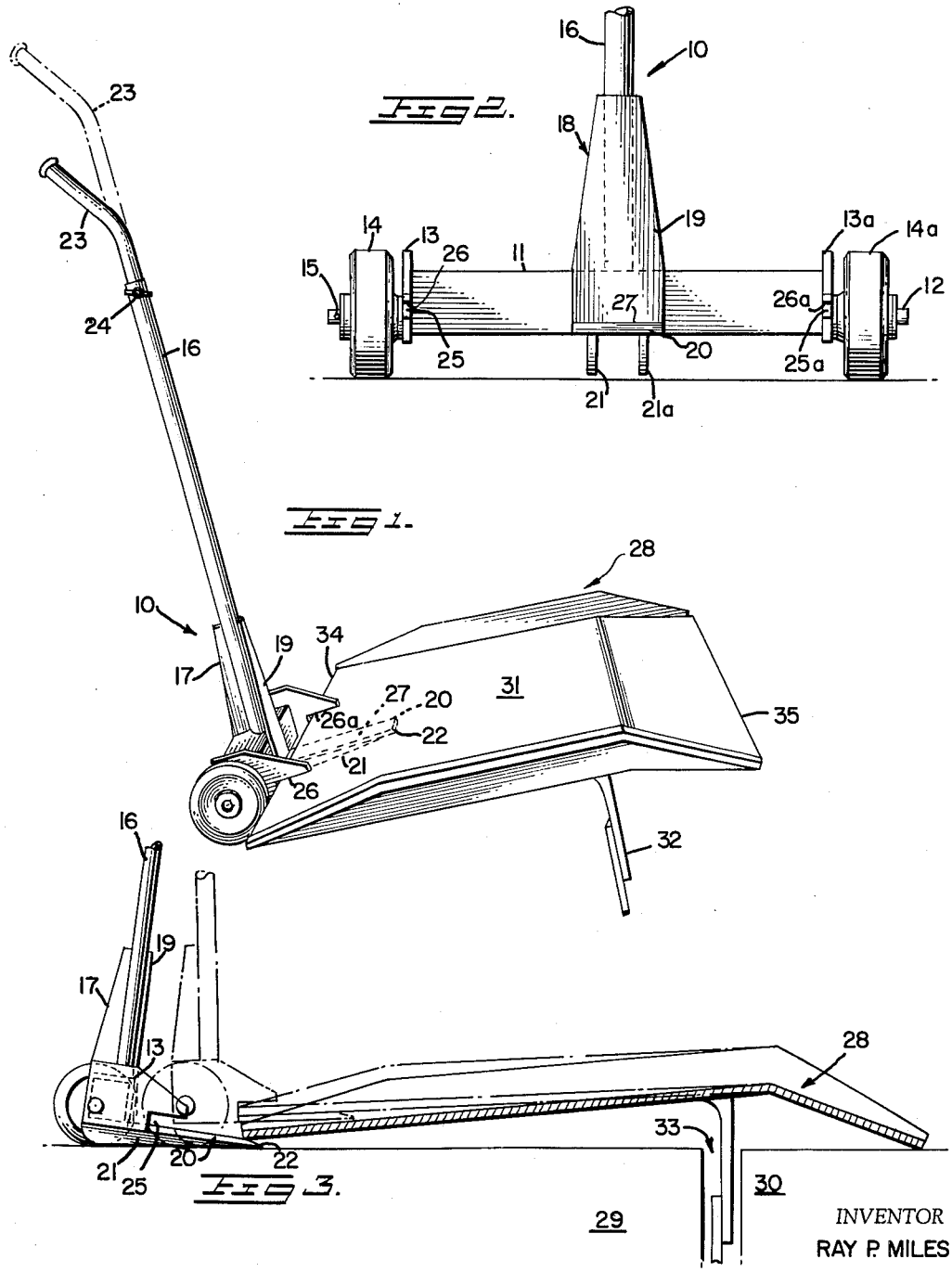

3,257,018
HAND TRUCK
Ray P. Miles, 8575 N. Melody Lane, Northfield, Ohio
Filed Aug. 16, 1965, Ser. No. 479,799
6 Claims. (Cl. 214—370)

This application is a continuation-in-part of my copending application Serial No. 374,047, filed June 10, 1964, now abandoned.

This invention relates to a hand truck and more particularly a hand truck for moving dockboards and the like from one point of use to another.

The hand truck of this invention finds particular use for handling dockboards. Dockboards are heavy metal plates which are used between a loading platform and a truck, railroad car, etc. The dockboard provides a span or bridge to permit the loading and unloading of material on carts, dollies, etc., in addition to providing a safe footway therebetween.

The dockboards are normally too heavy to be lifted by one man and lift trucks or extra manpower is required to move them from one point of use to another.

Therefore, an object of this invention is to provide a hand truck particularly adapted to lifting and moving dockboards whereby one operator can lift and move a heavy dockboard or the like, and which eliminates the need of a lift truck.

Another object of this invention is to provide a hand truck which can handle various sizes and shapes of dockboards, sheets, metal plates, boards, etc., which is simple in construction and economical to manufacture.

Another object of this invention is to provide a hand truck which comprises a horizontally disposed base member of rugged construction, handle means secured to the base member, rotatably mounted wheel means, stop means spaced apart on said base member each of which include a balancing means, and lift means disposed perpendicularly from said base member and located between said stop means. The balancing means and the lift means are substantially parallel to each other and provide a space for receiving an edge of a member to be transported and furthemore act in a gripping manner on said edge when the hand truck is tilted about its wheels.

Other objects and advantages of the invention will become apparent from the following description of an embodiment of the invention taken in connection with the accompanying drawing, in which:

FIGURE 1 is a perspective view of the hand truck of the invention shown engaging a dockboard;

FIGURE 2 is a front elevational view of the hand truck of the present invention; and FIGURE 3 is a side elevational view, partly in phantom and with one wheel removed, showing how the hand truck engages a dockboard to be moved.

In the drawings, the numeral 10 generally designates a hand truck having a horizontally disposed base member 11 in the form of a beam of steel tubing or the like. A shaft 12 extends through the base member 11. A pair of balancing stops 13 and 13a are welded to each end of the beam 11. A pair of wheels 14 and 14a are mounted on roller bearings on each end of the shaft 12 and secured thereon by any suitable means such as a cotter pin 15. A handle 16 is secured as by welding centrally of the base member 11. A reinforcing brace plate 17 is welded to the handle 16 and base member 11. An L-shaped member generally designated at 18 is comprised of a normally vertical portion 19 and a normally horizontal lift fork portion 20. The portion 19 of the L-shaped member is welded to handle 16 and base member 11. A pair of tapered reinforcing members 21 and 21a are welded to the bottom of lift fork 20 and the bottom of base member 11. The reinforcing members 21 and 21a and lift fork 20 form a leading edge 22, the purpose of which will be described hereinafter.

The handle 16 contains a telescoping portion 23 whereby the handle length may be adjusted for proper leverage. A wing nut 24 is provided for securing the telescoping portion at the desired adjustment.

The stops 13 and 13a are formed with cutaway portions 25 and 25a respectively and contain upper surfaces 26 and 26a which act as balancing means as will be seen hereinafter. These surfaces are substantially parallel to the top surface 27 of lift fork 20, and the combination provides a space therebetween to receive an edge of a dockboard.

The hand truck is particularly provided for the purpose of transporting heavy dockboards from one place to another. Dockboards such as the one shown generally at 28 are used as shown in FIGURE 3 to extend between a dock floor 29 and a floor 30 of transport means such as a freight car, truck, etc. The dockboard 28 generally comprises a top surface 31 and a stabilizing element 32 which fits in area 33 between the dock floor 29 and the floor 30 of the transport means. Edges 34 and 35 rest on the respective floors.

When the dockboard 28 is desired to be moved to another position, the operator moves the hand truck 10 in position near the edge 34 of the dockboard as shown in FIGURE 3. The operator then gives the hand truck a quick nudge with his foot on the base member 11 to wedge the leading edge 22 of the lift fork 20 under the edge 34 of the dockboard. A further nudge on the base member will move the fork underneath the dockboard and the edge 34 will ride along the surface 27 of the fork until it engages the stops 13 and 13a and balancing means 26 and 26a. The surface 31 of the dockboard near the edge 34 will contact the balancing means 26 and 26a. The phantom view of FIGURE 3 shows the dockboard fully engaged in the hand truck prior to removal thereof from floors 29 and 30.

In order to remove the dockboard from its position on the floors 29 and 30, the operator applies light toe pressure to the base member 11 and swings the handle 16 of the hand truck shown in FIGURE 1 in a counterclockwise direction. By so doing, the dockboard is gripped by the lift fork and the balance means and is tilted upwardly whereby the stabilizing element 32 is removed from the area 33. Further counterclockwise movement of the handle will bring the dockboard into a more or less balanced vertical position permitting the operator to move the hand truck and dockboard to another area of use or storage. Upon reaching another area of use, the dockboard may be placed in position by applying foot pressure to the base member 11 and swinging the handle in a clockwise direction to lower the stabilizing element 32 into a stabilizing area until the dockboard edges contact the floor. The hand truck is then moved backwardly to permit removal of fork 20 from contact with the dockboard.

Since the handle 16 is adjustable, the operator can adjust the handle length for proper leverage and balancing depending upon the weight and size of the dockboard.

Although the invention has been particularly described in the embodiment above and with particular reference to use with dockboards, it is understood that the invention is not limited thereto. Thus, the hand truck could be comprised of more than one lift fork with stop and balancing means disposed between the lift forks and on the sides thereof. In addiiton, additional wheels could be disposed on the base member. In addition to dockboards, the hand truck is capable of handling metal sheets and plates, wood boards, etc. Any type of member having an edge which can be inserted between the lift fork and the balancing means can be handled by the hand truck. In practice, the hand truck has easily handled members having an edge up to an inch in thickness, although it is contemplated that larger edge thicknesses can be handled. Furthermore, the invention also contemplates the use of adjustable balancing means whereby the space between the balancing means and the lift fork can be varied to accommodate various edge thicknesses.

What is claimed is:

1. A hand truck comprising a horizontally disposed base member, handle means secured to said base member, wheels rotatably mounted on said base member, spaced apart stop means comprising balancing means on said base member, lift means between said stop means being disposed perpendicularly from said base member, said lift means and said balancing means extending outwardly from said base member and said wheels and having surfaces substantially parallel to each other and providing a space therebetween for receiving an edge of a movable member, whereby said lift means and said balancing means act in a gripping manner on said edge of said movable member when said hand truck is tilted about said wheels.

2. The hand truck of claim 1 wherein said handle means is adjustable to varying lengths.

3. The hand truck of claim 1 wherein said lift means is comprised of L-shaped means secured to said handle means and said base member.

4. The hand truck of claim 1 wherein said lift means comprises a leading edge.

5. The hand truck of claim 4 wherein said lift means comprises tapered reinforcing means terminating at said leading edge.

6. A hand truck comprising a base member, adjustable handle means secured to said base member, wheels rotatably mounted at each end of said base member, stop means mounted on said base member adjacent each of said wheels, said stop means comprising balancing means including balancing surfaces, an L-shaped member between said stop means secured to said base member and said handle means, said L-shaped member including lift means being disposed perpendicularly from said base member, said lift means comprising tapered reinforcing means terminating in a leading edge and a surface parallel to said balancing surfaces, said lift means surface and said balancing surfaces providing a space therebetween for receiving an edge of a movable member, whereby said lift means and said balancing means act in a gripping manner on said edge of said movable member when said hand truck is tilted about said wheels.

References Cited by the Examiner

UNITED STATES PATENTS 1,732,804  10/1929  Chicoine et al. _____ 294—15

GERALD M. FORLENZA, *Primary Examiner.*

A. J. MAKAY, *Assistant Examiner.*